US012779663B2

(12) United States Patent
Kim et al.

(10) Patent No.: US 12,779,663 B2
(45) Date of Patent: Nov. 3, 2026

(54) MOBILE ROBOT WITH BATTERY DISCHARGE-PREVENTING PERFORMANCE AND METHOD FOR CONTROLLING THE SAME

(71) Applicant: Wonik Robotics Co., Ltd., Seongnam-si (KR)

(72) Inventors: Dae Hyeon Kim, Uiwang-si (KR); Hyeon Soo Kim, Uiwang-si (KR)

(73) Assignee: Wonik Robotics Co., Ltd., Seongnam-si (KR)

( * ) Notice: Subject to any disclaimer, the term of this patent is extended or adjusted under 35 U.S.C. 154(b) by 50 days.

(21) Appl. No.: 18/912,552

(22) Filed: Oct. 10, 2024

(65) Prior Publication Data

US 2026/0061593 A1 Mar. 5, 2026

(30) Foreign Application Priority Data

Aug. 28, 2024 (KR) ........................ 10-2024-0115627

(51) Int. Cl.

*B25J 5/00* (2006.01)
*B25J 9/16* (2006.01)
*B25J 13/08* (2006.01)
*B25J 19/00* (2006.01)

(52) U.S. Cl.

CPC ............ *B25J 5/007* (2013.01); *B25J 9/1664* (2013.01); *B25J 13/08* (2013.01); *B25J 19/005* (2013.01)

(58) Field of Classification Search

None

See application file for complete search history.

(56) References Cited

U.S. PATENT DOCUMENTS

2023/0294311 A1* 9/2023 Inoue ........................ B25J 5/007 318/568.12

FOREIGN PATENT DOCUMENTS

WO WO-2018072158 A1 * 4/2018 ............ B25J 9/1689

OTHER PUBLICATIONS

English WIPO translation of WO-2018072158-A1. (Year: 2018).*

* cited by examiner

*Primary Examiner* — Christopher A Buksa

(57) ABSTRACT

The present invention relates to a mobile robot with battery discharge-preventing performance, comprising: a main body; and a control unit for controlling motion of a driving member that moves the main body by a power stored in a battery, wherein the control unit moves the main body to the charging station using the driving member in order to charge the battery depending on a second residual level of the battery, wherein power supply of the battery to the control unit is blocked depending on a first residual level of the battery, and the second residual level is higher than the first residual level.

10 Claims, 8 Drawing Sheets

[FIG. 1]
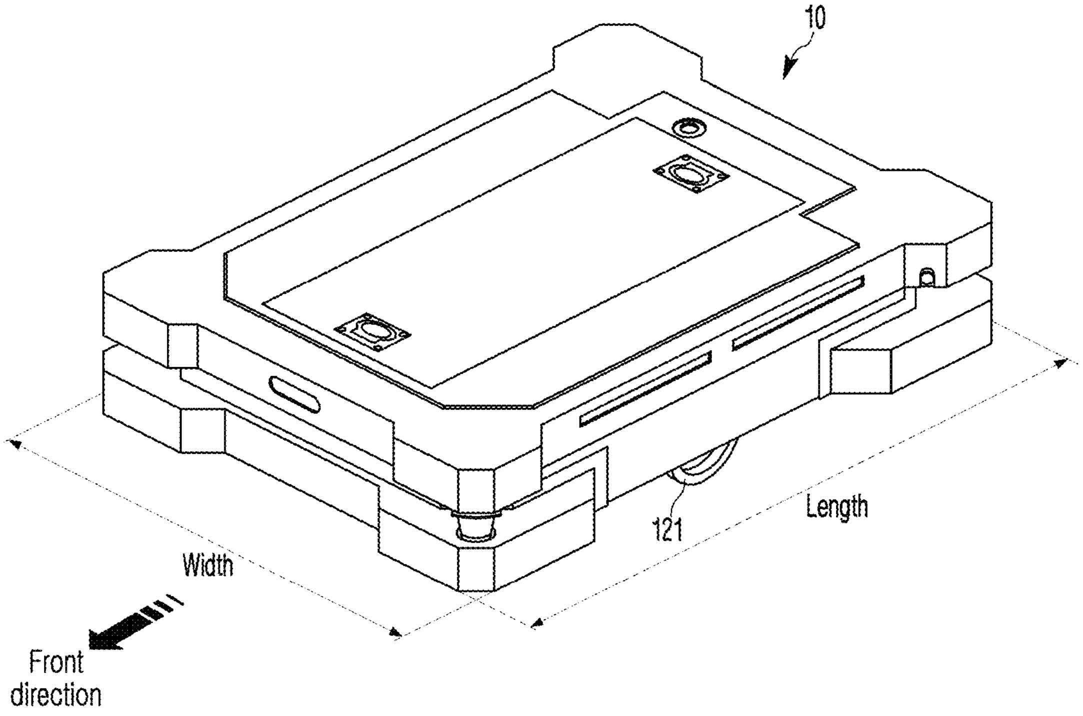

[FIG. 2]
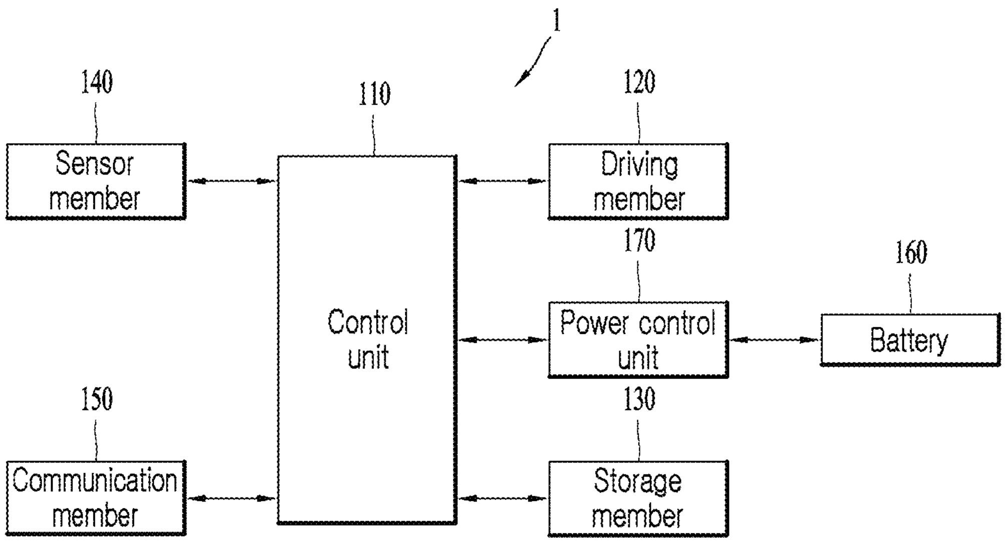

[FIG. 3]
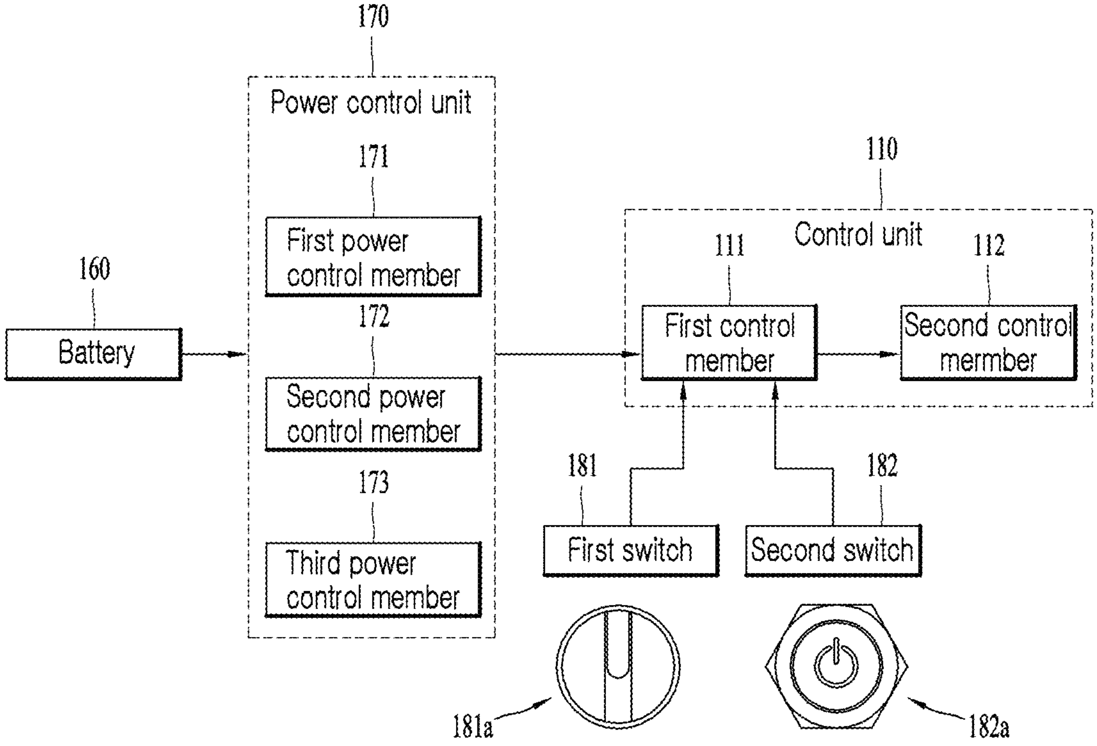

[FIG. 4]
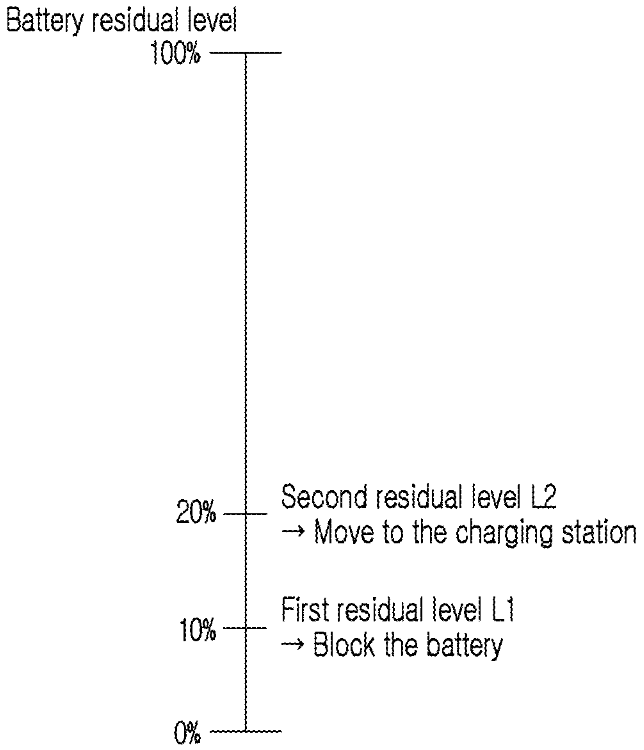

[FIG. 5]
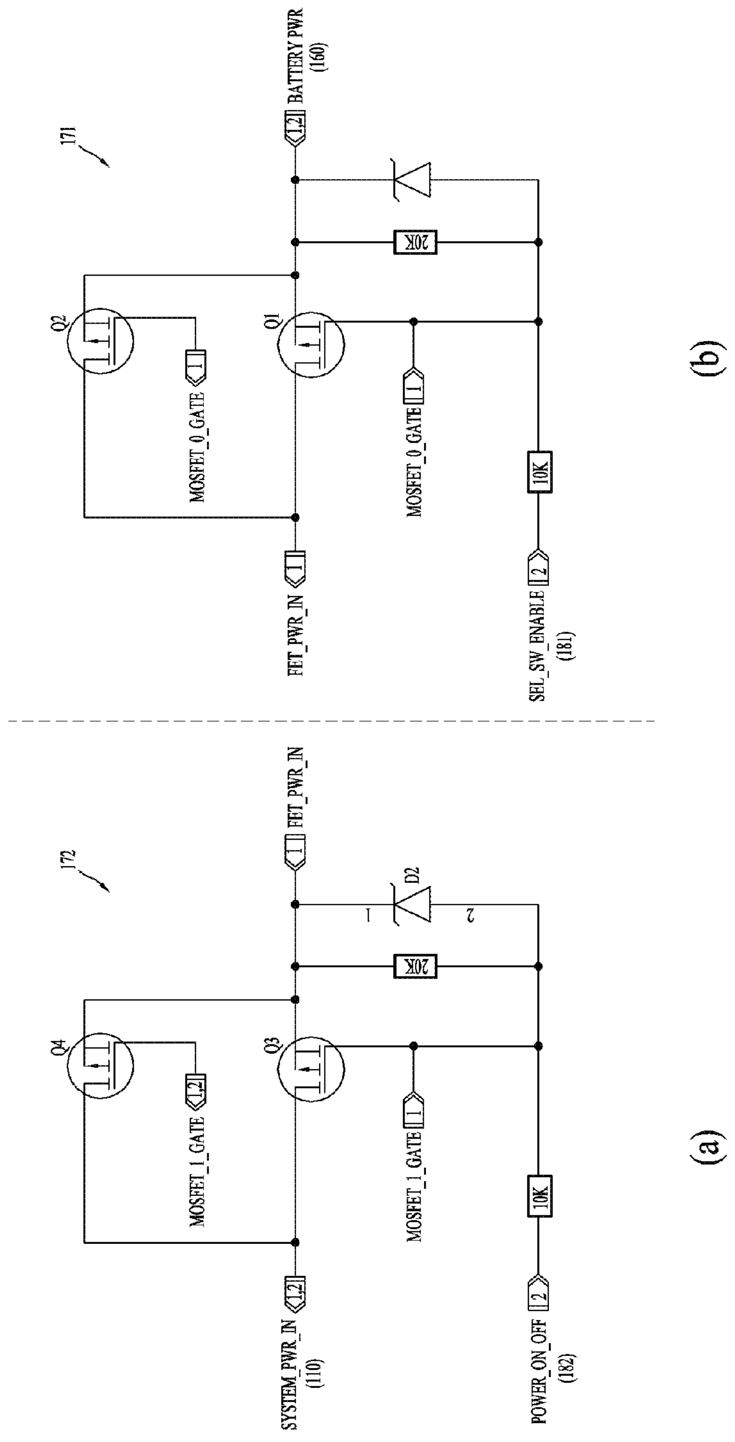

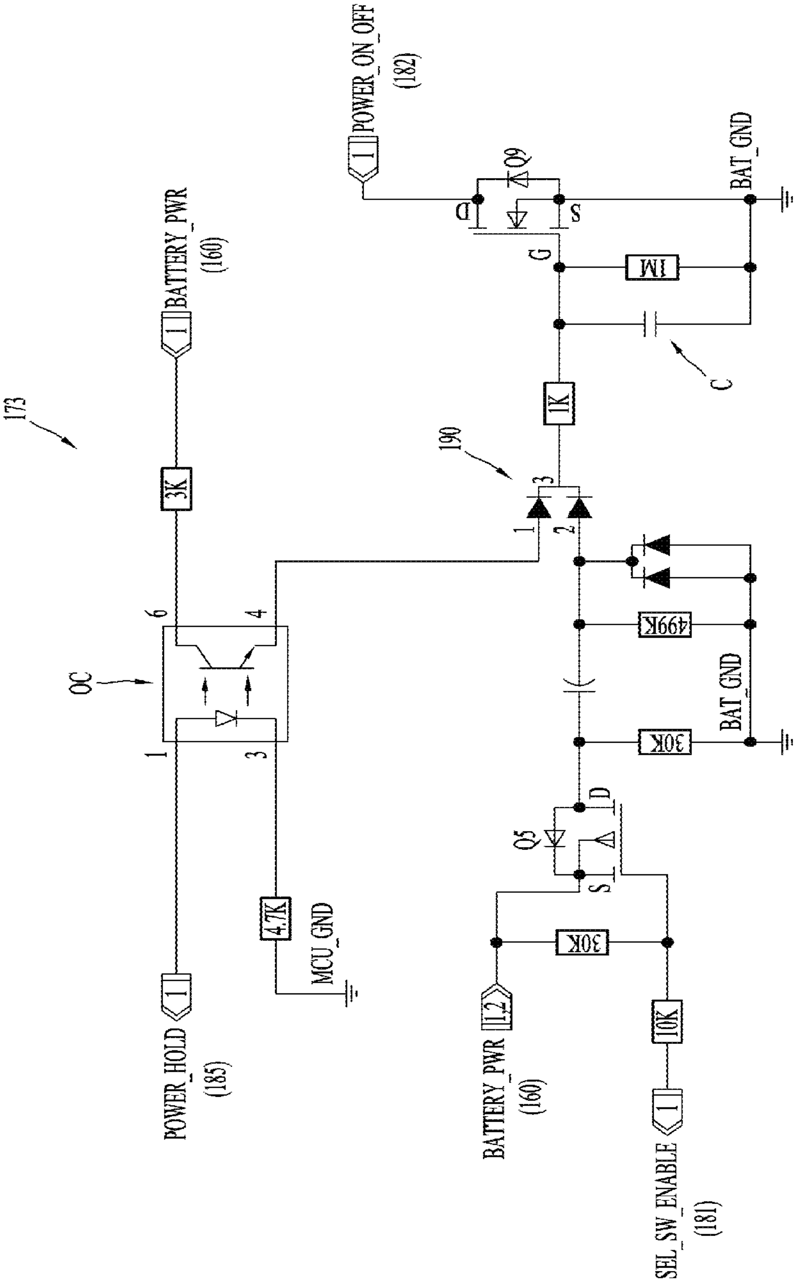
[FIG. 6]

[FIG. 7]
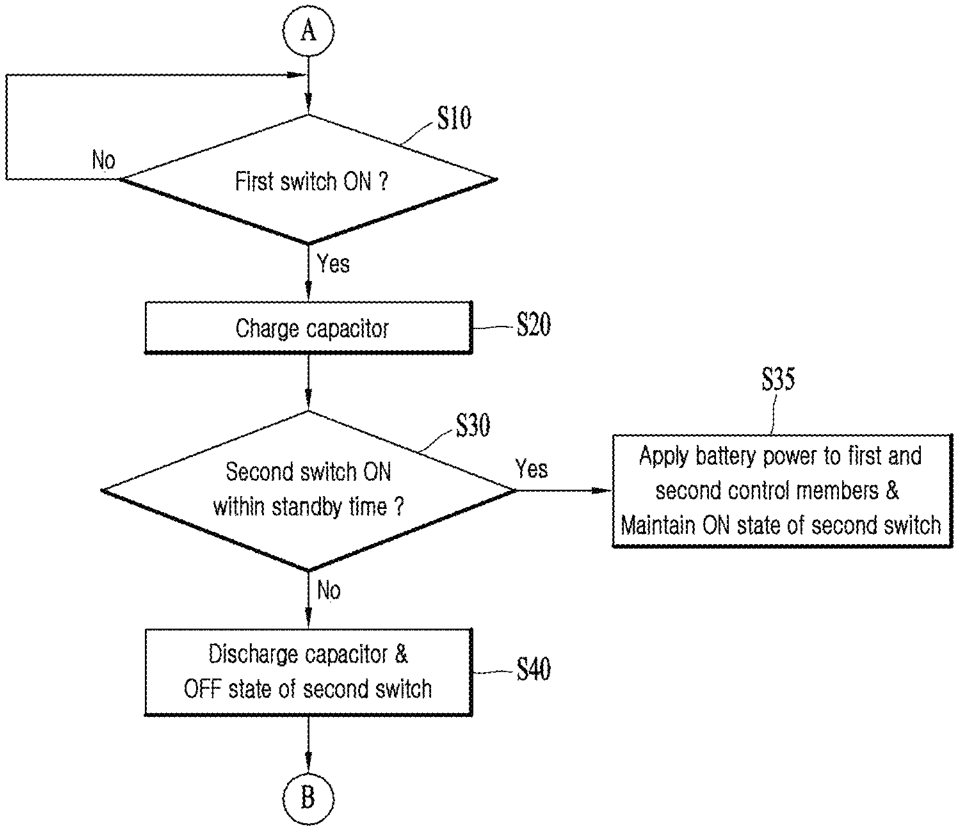

[FIG. 8]
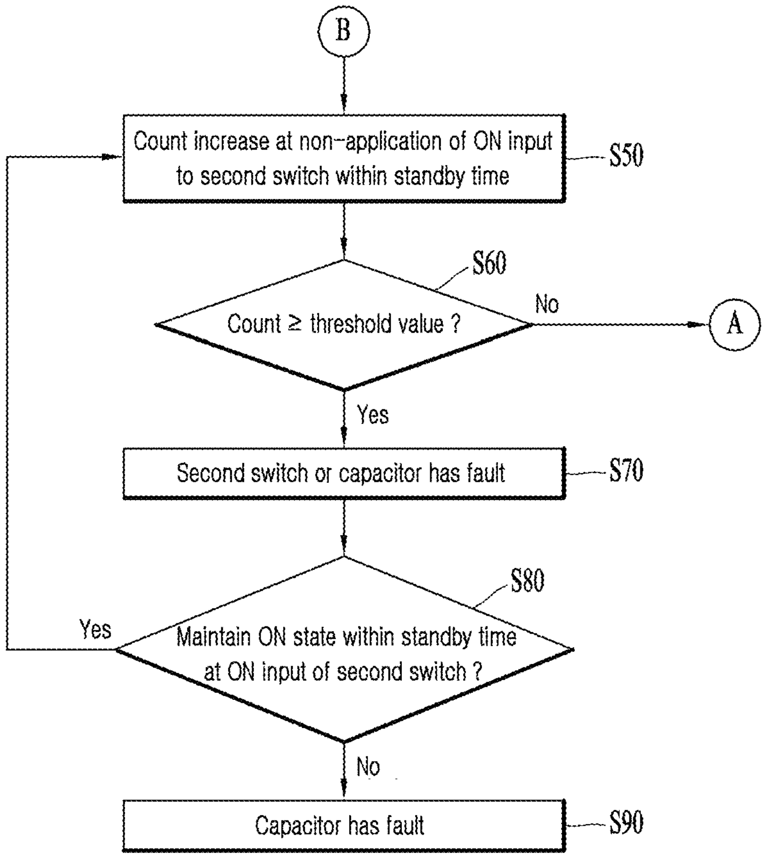

MOBILE ROBOT WITH BATTERY DISCHARGE-PREVENTING PERFORMANCE AND METHOD FOR CONTROLLING THE SAME

BACKGROUND OF THE INVENTION

Field of Invention

The present invention relates to a mobile robot with battery discharge preventing performance, and a method for controlling the same. Recently, with the development of robot technology, diverse types of robots including household robots to afford different services such as cleaning, a variety of industrial robots for factory, etc. have been proposed.

Autonomically movable robots use energy stored in a battery and, in order to continuously perform given tasks, need recharging the battery. In this regard, conventional mobile robots periodically or non-periodically move to a charging station and conduct autonomous recharging (Korean Patent Registration No. 10-0115624 or the like).

Meanwhile, when a mobile robot executes a task while autonomically moving, the mobile robot may abnormally maintain a movement stopped state due to a sensing error of a sensor or a program fault.

In particular, in a time zone when there is no person who controls the mobile robot (for example, early in the morning, etc.), the mobile robot may be in a movement stopped state and, in this case, although a remaining battery level (or battery residual) is a charge requiring level, the mobile robot cannot move to a charging station and may cause the battery to be completely discharged. Even without movement, the mobile robot in an active state may continuously consume standby power and the battery may be completely discharged.

When the mobile robot has a small size or a light weight, a user may move the mobile robot to the charging station and charge the same without any problem. However, if the mobile robot is too big and heavy to be held by a person, it is very difficult and troubled to overcome the above problem.

Previously, a user connects a movable battery to the completely discharged mobile robot and charges the same to a level at which the mobile robot can move to a charging station, otherwise, disjoints a wheel brake of the mobile robot and then pushes the same to the charging station, that is, moves the robot by force.

Related Art Document

Patent Document (Patent Document 1) KR10-0115624 B1

SUMMARY OF THE INVENTION

An object of the present invention is to provide a mobile robot capable of autonomically moving to a charging station, which escapes a non-movement state by preventing the mobile robot from being completely discharged even when it is unexpectedly unable to move, as well as a control method of the same.

In order to overcome the above problem, the present invention provides a mobile robot with battery discharge-preventing performance, comprising: a main body; and a control unit for controlling motion of a driving member that moves the main body by a power stored in a battery, wherein the control unit moves the main body to the charging station using the driving member in order to charge the battery depending on a second residual level of the battery, wherein power supply of the battery to the control unit is blocked depending on a first residual level of the battery, and the second residual level is higher than the first residual level.

According to one embodiment of the present invention, the control unit may include a first control member to activate a second control member, and the second control member that transfers from the active state to an inactive state depending on the first residual level of the battery, and may further include a power control unit provided to be electrically connected between the battery and the first control member in order to control power supply of the battery to the first control member depending on the active state of the second control member, wherein, when the first control member sensing the second control member in active state has sensed the second control member in inactive state, the power control unit may block the power supply of the battery to the first control member.

According to another embodiment of the present invention, the power control unit may be electrically connected to the first control member and the second control member in series so that, when the power supply of the battery to the first control member is blocked, power supply of the battery to the second control part is also blocked.

According to another embodiment of the present invention, the first control member may sense operation condition of first and second switches and, when the first and second switches are sensed to ON state, the first control member may activate the second control member, and the power control unit may control the power supply of the battery to the first control member depending on the operation condition of the first and second switches.

According to another embodiment of the present invention, the power control unit may include a capacitor to charge/discharge the power of the battery, wherein the capacitor is charged according to ON state of the first switch, transfers the second switch to ON state and, when ON input is not applied to the second switch from the user within a predetermined standby time, the capacitor does not maintain the charged state but is discharged whereby the second switch can be transferred to OFF state.

According to another embodiment of the present invention, the power control unit may apply the power of the battery to the first and second control members to activate the second control member when ON input is applied by the second switch within the standby time, and the capacitor may maintain the charged state according to the active state of the second control member received from the first control member so as to retain the second switch in ON state.

According to another embodiment of the present invention, the power control unit may include a counter to count frequency thereof when ON input is not applied by the second switch within the standby time and, if the frequency counted by the counter is equal to or more than a preset threshold value, the power control unit may determine that the second switch or the capacitor has fault.

According to another embodiment of the present invention, the power control unit may determine that the capacitor has fault if ON input to the second switch was applied from the user during the frequency counted by the counter, however, the second switch did not maintain ON state but was transferred to OFF state within the standby time.

According to another embodiment of the present invention, the first switch may comprise a form factor-different switch that ON state and OFF state have different appearances, while the second switch may comprise a form factor-identical switch that ON state and OFF state have the same appearance.

Further, the present invention provides a control method of a mobile robot with battery discharge-preventing performance, the mobile robot comprising: a main body; and a control unit for controlling motion of a driving member that moves the main body by a power stored in a battery, and the control method comprising: a step of moving the main body to the charging station by the control unit using the driving member in order to charge the battery depending on a second residual level of the battery; and a step of blocking power supply of the battery to the control unit depending on a first residual level of the battery, wherein the second residual level is higher than the first residual level.

According to one embodiment of the present invention, a mobile robot unexpectedly unable to move is prevented from being completely discharged so that the mobile robot escapes a non-movement state, thereby allowing the same to autonomically move to a charging station.

BRIEF DESCRIPTION OF THE DRAWINGS

FIG. 1 is an exemplary view illustrating appearance of a mobile robot according to an embodiment of the present invention.

FIG. 2 is a configuration view of the mobile robot according to an embodiment of the present invention.

FIG. 3 illustrates the configuration of a power control unit and a control unit in relation to a battery according to an embodiment of the present invention.

FIG. 4 is an exemplary view illustrating movement of the mobile robot depending on a battery residual level according to an embodiment of the present invention.

FIG. 5 illustrates specific circuit diagrams of first and second power control units according to an embodiment of the present invention.

FIG. 6 is a partial circuit diagram including a capacitor of the power control unit according to an embodiment of the present invention.

FIG. 7 illustrates a process of charging/discharging the capacitor in the power control unit by stages according to an embodiment of the present invention.

FIG. 8 is a flow diagram illustrating a process of determining faults of the capacitor in the power control unit according to an embodiment of the present invention.

DETAILED DESCRIPTION OF THE INVENTION

Hereinafter, the embodiments disclosed in the present specification will be described in detail with reference to the accompanying drawings, but the same or similar components are assigned the same reference numbers regardless of reference numerals, and redundant description thereof will be omitted. The suffixes "module" and "part" for the components used in the following description are given or mixed in consideration of only the ease of writing the specification, however, do not have distinct meanings or roles by themselves. Further, in describing the embodiments disclosed in the present specification, if it is determined that detailed descriptions of related known technologies may obscure the gist of the embodiments disclosed in this specification, the detailed description thereof will be omitted. Further, the accompanying drawings are only for easy understanding of the embodiments disclosed in the present specification, and the technical idea disclosed herein is not limited by the accompanying drawings, and all changes included in the spirit and scope of the present invention should be understood to include equivalents or substitutes.

When an element is referred to as being "coupled" or "connected" to another element, it is understood that it may be directly coupled or connected to the other element, but other elements may also exist therebetween. On the other hand, when it is said that a certain element is "directly coupled" or "directly connected" to another element, it should be understood that other elements do not exist therebetween.

The singular expression includes the plural expression unless the context clearly dictates otherwise.

In this specification, terms such as "include . . . " or "have . . . " are intended to designate that the features, numbers, steps, operations, components, parts, or combinations thereof described in the specification exist, but it should be understood that it does not preclude the existence or addition of one or more other features, numbers, steps, operations, components, parts, or combinations thereof.

FIG. 1 is an exemplary view illustrating appearance of a mobile robot according to an embodiment of the present invention, while FIG. 2 is a configuration view of the mobile robot according to an embodiment of the present invention.

As shown in FIGS. 1 and 2, the mobile robot 1 with battery discharge-preventing performance according to an embodiment of the present invention may include a main body 10, and a control unit 110 for controlling motion of a driving member 120 that moves the main body 10 by a power stored in a battery 160, and the driving member 120 may drive a wheel 121 using a drive device by a control command of the control unit 110 so as to move the main body 10 in different directions including front and rear directions.

Such a mobile robot 1 as described above is a robot executing motion task given by the user, types of the robot are not particularly limited and individual components will be described in detail below.

The main body 10 may form an external appearance of the mobile robot, for example, as shown in FIG. 1, the main body 10 has a predetermined length and width, and a relatively low height, wherein the height of the main body may be shorter than the width and the length.

In this regard, the front direction of the main body 10 may be any one direction among directions to which the main body can drive. In the present specification, as shown in FIG. 1, the front direction may be the direction of any one side having narrow right and left widths of the main body 10 and it would be described with reference to the same, however, the scope of the present invention is duly not limited thereto.

The mobile robot 1 according to an embodiment of the present invention may include a driving member 120 in order to move the main body.

More particularly, the driving member 120 may include at least one wheel 121 to move the main body, and a drive device comprising a motor or the like in order to rotatably drive the wheel 121 around a shaft thereof.

The wheel is a rotary body provided to be rotatable around a rotational axis in the width direction, and may be provided in plural on the bottom surface of the main body 10. The number of wheels is not particularly limited in the present invention, however, as shown in FIG. 1, two main wheels may be provided on both right and left sides in the main body 10 in the width direction, respectively. Further, at least one vertical wheel may be provided in front and rear directions of a pair of main wheels. Herein, the main wheel may be a wheel actively rotating by driving a drive motor, while the vertical wheel may be a wheel passively rotating according to movement of the main body 10 without following the driving of the motor or the like. That is, the main body 10 may not be inclined toward any one side but may be supported by the vertical wheel to maintain approximately horizontal level while being spaced by a predetermined height from the ground.

The driving member 120 of the mobile robot according to an embodiment of the present invention may further include a steering unit to set a driving direction of the wheel 121 in front and rear directions and right and left directions. However, in the case where the steering unit is not included, the driving member 120 may change a driving direction of the main body in the left or right side without the steering unit by moving a pair of main wheels provided on both left and right sides of the main body 10, respectively, in front and rear directions with making a difference in revolution rates of the main wheels, or the driving member 120 may turn clockwise or counter-clockwise or around on its axis. To that end, the mobile robot 1 according to an embodiment of the present invention may include a pair of drive motors separately operated to afford power to the pair of main wheels, respectively, thereby enabling each of the paired main wheels to be driven.

Meanwhile, the mobile robot 1 according to an embodiment of the present invention may include a battery 160 to store the power required for performing different motions.

The battery 160 capable of discharging electrical energy stored therein if needed is preferably re-chargeable in many times. In this regard, a battery management system (BMS) may monitor conditions of the battery 160 or control the operation thereof, for example, may measure voltage and/or current of the battery 160 and control the voltage and current to prevent the battery 160 from being overcharged or overdischarged, or may measure a temperature of the battery 160 and control the operation of the battery 160 in order to act the battery 160 in the range of normal temperature, thereby optimizing the performance of the battery 160 and safely operating the same.

Further, the mobile robot 1 according to an embodiment of the present invention may include a storage member 130 that stores a control program to control or drive the mobile robot 1 and data therefrom. For particular example, the storage member 130 may store a map for task area or a driving mode within the task area, in addition, audio information, image information, obstacle information, location information, etc.

The storage member 130 may mainly use a non-volatile memory wherein the non-volatile memory (NVM, NVRAM) is a storage unit capable of continuously maintaining the stored information even without power supply, and may include, for example, ROM, flash memory, magnetic computer memory device (e.g., hard disk, diskette drive, magnetic tape), optical disk drive, magnetic RAM, PRAM, or the like.

Meanwhile, a sensing member 140 may include at least one among an external signal sensing sensor, a forward sensing sensor, a cliff sensing sensor, a camera sensor and a position sensor.

The external signal sensing sensor may sense external signals outside the mobile robot 1. The external signal sensing sensor may include, for example, an infrared ray sensor, an ultrasonic sensor, a radio frequency sensor (RF sensor), etc. The mobile robot 1 may receive input of control command according to the signal sensed by the external signal sensing sensor other than the information received through a communication member 150.

The forward sensing sensor may be installed in the front direction of the mobile robot 1, specifically, by a constant interval along a lateral outer circumferential surface of the mobile robot 1. The forward sensing sensor is positioned on at least one side of the mobile robot 1 to sense obstacles in the front direction. The forward sensing sensor may include, for example, any one among a lidar, an infrared sensor, an ultrasonic sensor, RF sensor and a geomagnetic sensor or a combination thereof.

The cliff sensing sensor (or cliff sensor) may mainly use an optical sensor in diverse forms to sense obstacles on the bottom surface that supports the main body of the mobile robot 1. The cliff sensor may include, for example, any one among an infrared sensor, an ultrasonic sensor, RF sensor and a position sensitive detector (PSD) sensor installed on the bottoms surface of the robot, or a combination thereof.

The camera sensor is installed to direct an upper or front direction of the main body in the mobile robot 1 so as to take pictures of the surroundings. The camera sensor may be provided, for example, in plural and arranged at a predetermined distance or by a predetermined angle on the top or lateral side of the main body in the mobile robot 1. The camera sensor may include a lens for focusing on a subject, a regulator for adjusting the camera sensor, a lens regulator for adjusting the above lens. On the other hand, the control unit 110 may recognize a current position of the robot using the image data taken by the camera lens, and prepare a map for the task area.

The position sensitive detector (that is, position sensor) is for recognizing a posture of the mobile robot 1 and may include any one among an acceleration sensor, a gyro sensor and a wheel sensor or a combination thereof, while the control unit 110 may precisely recognize the current position according to the combination of the above sensor and image data of the camera sensor.

Meanwhile, the communication member 150 is for performing communication with any external terminal or server, wherein a communication mode used herein may be a wired or wireless mode. For example, the communication mode may include any one among: wireless internet mode such as wireless LAN (WLAN), wireless fidelity direct (WiFi), digital living network alliance (DLNA), wireless broadband (Wibro), World Interoperability for Microwave Access (Wimax), high speed download packet access (HSDPA), etc.; mobile communication mode; or short-range (or local) wireless communication mode such as radio frequency (RF) communication. Bluetooth, infrared communication (IrDA), Zigbee, etc.

Further, the control unit 110 is a means for controlling overall action of the mobile robot 1, may execute a variety of application programs in communication with separate components of the mobile robot 1, and may allow actions relevant to the same. That is, the control unit 110 may treat signals or data input/output through the components of the mobile robot 1 or drive the application program stored in the storage member 130, so as to control different actions of the mobile robot 1. Further, in order to drive the application program stored in the storage member 130, the actions of at least some of the components in the mobile robot 1 may be controlled.

For particular example, the control unit 110 may use obstacle information detected by the forward sensing sensor or the obstacle sensing sensor and the position recognized by at least one camera sensor, in order to prepare a map for the task area. Among the terms used in the present specification, the task area may be an area formed by obstacles such as a wall or the like, and the method of preparing the map for the task area may comply with the known method and would not be particularly limited in the present invention. However, the map may not be produced while the mobile robot 1 is autonomically driven, instead, may be provided from the outside and stored in the storage member 130.

The control unit 110 according to an embodiment of the present invention may use the driving member 120 to move the main body 10 to the charging station in the map (not shown) in order to charge the battery 160 depending on the level of electric energy or power remained in the battery 160, thereby autonomically charging the battery. Specifically, as shown in FIG. 4, the control unit 110 may move the main body 10 to the charging station and charge the battery 160 if the residual level of the battery 160 is less than the second residual level L2.

While the task is implemented while the mobile robot 1 autonomically moves within the task area, the mobile robot may abnormally maintain a movement-stopped state due to unexpected different reasons such as sensor fault or program error.

In particular, when the remaining power of the battery 160 reached the second residual level L2, as shown in FIG. 4, the control unit 110 may move the main body 10 to the charging station in order to charge the battery 160. However, during the above process, if the movement is stopped unexpectedly, the power stored in the battery 160 may be continuously and completely discharged. The control unit 110 in active state detects the condition of each component in the mobile robot 1 or the standby power is continuously exhausted in standby state at which the components can be operated according to user input or a series of given stages, therefore, when the remaining power of the battery 160 is the first residual level L1 lower than the second residual level L2, that is, the remaining energy of the battery 160 is equal to or lower than the first residual level L1, the control unit 110 may become inactive or it is preferable to block application of supply power from the battery 160 so as to prevent standby power exhaustion by the control unit 110.

As such, it is preferable to prevent the mobile robot 1, which is unexpectedly unable to move, from being completely discharged, thereby enabling the mobile robot 1 to autonomically move to the charging station after escaping a non-movement state by the user.

In this regard, a difference between the first residual level L1 and the second residual level L2 is not particularly limited, however, this difference may be equal to or more than a sum of maximum power consumption W1 required for moving the mobile robot 1 within the task area to the charging station and power consumption W2 exhausted when the movement is unintentionally stopped due to sensor fault or program error and recovery is attempted by system re-booting or the like. Further, the W2 power may be a power for enabling the mobile robot 1 to be operated during a time T2, which is a sum of a response standby time T1 preset as a time that the control unit 110 waits a response of each component in the mobile robot 1 or a time to wait a response to performance of action when a series of given actions is performed, and a rebooting time T2 of separate components including the control unit 110 in the mobile robot 1.

Meanwhile, the control unit 110 according to an embodiment of the present invention, as shown in FIG. 3, may include a first control member 111 that senses operation conditions of first and second switches 181, 182 and activates a second control member 112; and the second control member 112 activated by activation signals from the first control member 111.

The first control member 111 is a device for executing real-time processable arithmetic operation (or calculation) with power consumption lower than that of the second control member 112, and may sense the operation conditions of the first and second switches 181, 182. On the contrary, the second control member 112 is a device for executing complex or high-performance calculation with power consumption higher than that of the first control member 111, and whether to act the second control member 112 or not may follow the activation signal of the first control member 111. That is, the second control member 112 may be operated using the activation signal generated and applied by the first control member 111.

Thus, the first control member 111 may periodically or non-periodically and continuously sense the active state of the second control member 112, that is, whether the second control member 112 is now active or inactive. Further, as described below, the first control member 111 may apply active state signal 185, which is a signal due to the active state of the second control member 112 as a result of the above sensing, to the power control unit 170, specifically, a third power control unit 173.

Although not particularly limited, as shown in FIG. 3, the first control member 111 and the second control member 112 may be electrically connected in series. Specifically, the battery 160, the power control unit 170, the first control member 111 and the second control member 112 may be sequentially connected in series whereby, when power supply of the battery 160 to the first control member 111 is blocked, power supply of the battery 160 to the second control member 112 may also be blocked.

The first switch 181 with the operation condition sensed by the first control member 111 is a means to receive user input for applying the battery 160 to each component of the mobile robot 1 and is not particularly limited in the present invention, however, may be a form factor-different switch 181*a* that ON state and OFF state have different appearances.

Similarly, the second switch 182 with the operation condition sensed by the first control member 111 is a means that receives user input for transferring into active state as a state for normal operation of the mobile robot 1 applied with power of the battery 160 according to ON operation of the first switch 181 so as to implement the task. Although not particularly limited in the present invention, the second switch may be a form factor-identical switch 182*a* that ON state and OFF state have the same appearance. As descried below, the reason for the above configuration is that the ON/OFF states of the second switch 182 can undergo electrical transition based on the charge state of the capacitor C rather than physical change.

For particular example, the user may transfer the first switch 181 to ON state in order to apply the power of the battery 160 to each component of the mobile robot 1, thereafter, transfer the second switch 182 to ON state, thereby enabling the mobile robot 1 including the control unit 110 to enter the active state.

Further, the first control member 111 may confirm (or identify) the residual level of the battery 160 using a battery management system (BMS) or the like. Although not particularly limited in the present invention, the second control member 112 may also directly confirm (or identify) the residual level of the battery 160 using the battery or BMS. Accordingly, if the stored power of the battery 160 is less than the first residual level L1, the second control member 112 with high power consumption may be firstly transferred from the active state to the inactive state. Specifically, when the residual level of the battery 160 reached the first residual level L1, the second control member 112 may be naturally changed from the active state to the inactive state. Of course, the present invention is not particularly limited thereto, however, the first control member 111 may apply a non-activation signal to the second control member 112 based on the residual level of the battery 160 and, according to the applied non-activation signal, the second control member 112 may be induced to be transferred from the active state to the inactive state.

Alternatively, the mobile robot 1 according to an embodiment of the present invention, as shown in FIG. 3, may include a power control unit 170 provided to be electrically connected between the battery 160 and the control unit 110, specifically, between the battery 160 and the first control member 111.

The power control unit 170 is a device for controlling power supply of the battery 160 to the control unit 110, and specifically may apply power stored in the battery 160 to separate components including the control unit 110 in the mobile robot 1 or, on the contrary, may block power supply thereto.

According to a specific embodiment of the present invention, the power control unit 170, as shown in FIG. 5, may include a first power control member 171 and a second power control member 172, which are connected in series. At this time, the first power control member 171, as shown in FIG. 5(*b*), may include first elements (Q1, Q2) to control output flow of the battery 160 toward the second power control member 172 based on the operation condition of the first switch 181, while the second power control member 172, as shown in FIG. 5(*a*), may include second elements (Q3, Q4) to control the supplied power flow of the battery 160 passing through the first power control member 171 toward the control unit 110 based on the operation condition of the second switch 182.

Thus, if both of the first and second switches 181, 182 are ON state, the power of the battery 160 may pass through the first and second power control members 171, 172 in sequential order, and then, specifically may be applied to the first control member 111. However, if any one of the first and second switches 181, 182 is OFF state, any one of the first and second elements corresponding to the above switch may open the output flow of the battery 160 whereby the power of the battery 160 is not applied to the control unit 110, specifically, either the first control member 111 or the second control member 112. Accordingly, it is possible to fundamentally prevent standby power exhaustion of the battery 160 by the control unit 110.

Further, FIG. 6 is a specific circuit diagram illustrating the power control unit including a third power control member with a capacitor according to an embodiment of the present invention.

As shown in FIG. 6, the power control unit 170 according to an embodiment of the present invention may include a third power control member 173 including a capacitor C to charge/discharge based on the operation conditions of the first and second switches 181, 182, as well as the active state of the second control member 112. In this regard, the active state of the second control member 112 may be periodically or non-periodically and continuously sensed by the first control member 111, while the first control member 111 may apply an active state signal 185 indicating the above sensed result to the third power control member 173 (see reference numeral: 185).

The first and second power control members 171, 172 may be interconnected in series, however, the third power control member 173 may be separately provided unlike the first and second power control members 171, 172. At this time, the capacitor C in the third power control member 173 may be charged with the power supplied by the battery 160.

Specifically, as shown in FIG. 6, Q5 element is shorted according to ON state of the first switch 181, and the capacitor C may be charged with the output power of the battery 160. Further, an opto-coupler (OC) is also shorted according to the active state signal 185 to the second control member 112 applied from the first control member 111, and the capacitor C may be charged with the output power of the battery 160. That is, in the case where the first switch 181 is ON state by the user input or the second control member 112 is now normally acted in active state, the capacitor C may be charged.

The charged capacitor C may be discharged over time due to resistance. Further, Q9 element switched on/off by the charged voltage is shorted before the capacitor C is discharged, and thus may maintain the second switch 182 electrically ON state regardless of the user input. In this case, for example, if the second switch 182 is ON state, the corresponding signal may be grounded (GND) in ON state.

If the second switch 182 is applied with ON input by the user input before the capacitor C is discharged, the power may be applied to the first and second control members 111, 112 (see FIG. 5). Further, if the second control member 112 is normally acted and thus in active state, the capacitor C may maintain the charged state according to the active state signal 185 of the second control member 112 applied from the first control member 111. In the present specification, a time at which Q9 element maintains a short state by the charge voltage of the capacitor C is called 'a standby time' wherein the standby time may vary according to a capacity of the capacitor C and/or a size of resistance.

On the other hand, when ON input by the user is not applied to the second switch 182 within a predetermined standby time during which the capacitor C is discharged, the capacitor C does not maintain the charged state but is discharged, and the second switch 182 in ON state is shorted with GND and may be transferred in OFF state by opening Q9 element whereby power is not applied in serial to the first and second control members 111, 112 (see FIG. 5), and additional power consumption of the battery 160 may also be blocked.

Referring to the action process according to the above configuration, as shown in FIG. 7, when there is ON input to the first switch 181 from the user (S10), the capacitor C of the power control unit 170 may be charged (S20) while the second switch 182 becomes electrically ON state within the standby time. However, since the capacitor C is gradually discharged over time, the capacitor C is instantly discharged (S40) while the second switch 182 may be transferred to OFF state.

On the other hand, if there is ON input to the second switch 182 from the user, the power of the battery 160 is applied to the first and second control members 111, 112, wherein the first control member 111 sensing the second control member 112 in active state may continuously apply the active state signal 185, indicating that the second control member 112 is now in active state, to the third power control member 173 so that the charge state of the capacitor C and ON state of the second switch 182 can be maintained (S35).

Similarly, as described above, when the power remains of the battery 160 is less than a first residual level L1, the second control member 112 may become inactive. Therefore, when the first control member 111 continuously sensing the active state of the second control member 112 has sensed the second control member 112 in inactive state, the power control unit 170, specifically the third power control member 173 cannot maintain the capacitor C in charged state based on the active state signal 185 from the first control member 111, therefore, the second switch 182 also does not maintain ON state and, sequentially, the second power control member 172 blocks power supply to the first control member 111 whereby the first control member 111 as well as the second control member 112 may not exhaust standby power but prevent the battery 160 from being completely discharged.

As such, the mobile robot 1 according to an embodiment of the present invention may prevent the battery 160 from being completely discharged even when it is unexpectedly unable to move.

Meanwhile, FIG. 8 is a flow diagram illustrating a process of determining fault of the capacitor C by stages. As shown in FIG. 8, the power control unit 170 according to an embodiment of the present invention may include a counter (not shown) to count the frequency of ON input non-application by the user through the second switch 182 within the standby time after the first switch 181 is in ON state.

The counter may count the frequency of non-application to the second switch 182 from the user even though there is ON input of the first switch 181 (S50). At this time, if the number counted by the counter is equal to or more than a threshold value (S60), fault of the second switch 182 or the capacitor C can be outputted and notified with sound or light to the outside (S70).

The reason for the above configuration is why the first switch 181 is firstly operated to ON state, followed by operating the second switch 182 to ON state when a general user drives the mobile robot 1, therefore, if the frequency of non-application of ON input to the second switch 182 is equal to or more than the threshold value after operating the first switch 181 to ON state, it is possible to determine that the second switch 182 or the capacitor C has fault.

Further, when ON input to the second switch 182 was applied from the user during the counted frequency less than the threshold value by the counter, however, the second switch 182 did not maintain the sate within the standby time but was transferred to OFF state, fault of the capacitor C may be outputted and notified to the outside. The reason for this is why, if the capacitor C has fault, the standby time is not present or very short and thus the second switch 182 cannot maintain ON state.

Of course, notification of fault in the capacitor C and/or the second switch 182 may be connected to a normal power source of the battery 160. At this time, for example, a means for notification of fault may be a LED lamp with very low power consumption.

As described above, preferred embodiments of the present invention have been described in detail with reference to the accompanying drawings. The description of the present invention is for illustrative purposes, and those skilled in the art to which the present invention pertains will understand that it can be easily modified into other specific forms without changing the technical spirit or essential features of the present invention.

Accordingly, the scope of the present invention is indicated by the claims described later rather than the detailed description, and it should be interpreted that all changes or modifications derived from the meaning, scope, and equivalent concept of the claims are included in the scope of the present invention.

DESCRIPTION OF REFERENCE NUMERAL

1: Mobile robot 10: Main body
110: Control unit 111: First control member
112: Second control member 120: Driving member
130: Storage member 140: Sensor member
150: Communication member 160: Battery
170: Power control unit 171: First power control member
172: Second power control member 173: Third power control member
181: First switch
185: Active state signal
182: Second switch

What is claimed is:

1. A mobile robot with battery discharge-preventing performance, comprising:

a main body; and a control unit for controlling motion of a driving member that moves the main body by a power stored in a battery, wherein the control unit is configured to moves the main body toward a charging station using the driving member in order to charge the battery when a residual level of the battery reaches a second residual level;

wherein power supply from the battery to the control unit is blocked when the mobile robot fails to reach the charging station and the battery continues to drop to a first residual level;

wherein the second residual level is higher than the first residual level; and wherein a difference between the first residual level and the second residual level is at least equal to a sum of a maximum operational power (W1) required to navigate from the furthest point in a task area to the charging station and a recovery power (W2) required to maintain in an operative state when the mobile robot encounters an unintentional stop and needs to be recovered, the recovery power being calculated based on a recovery time comprising a sum of a response standby time and a rebooting time of one or more components of the mobile robot.

2. The mobile robot according to claim 1, wherein the control unit includes a first control member to activate a second control member, and the second control member that transfers from the active state to an inactive state depending on the first residual level of the battery, and the control unit further includes a power control unit provided to be electrically connected between the battery and the first control member in order to control power supply of the battery to the first control member depending on the active state of the second control member, wherein, when the first control member sensing the second control member in active state has sensed the second control member in inactive state, the power control unit blocks the power supply of the battery to the first control member.

3. The mobile robot according to claim 2, wherein the power control unit is electrically connected to the first control member and the second control member in series so that, when the power supply of the battery to the first control member is blocked, power supply of the battery to the second control part is also blocked.

4. The mobile robot according to claim 2, wherein the first control member senses operation condition of first and second switches and, when the first and second switches are sensed to "ON" state, the first control member activates the second control member, and the power control unit controls the power supply of the battery to the first control member depending on the operation condition of the first and second switches.

5. The mobile robot according to claim 4, wherein the power control unit includes a capacitor to charge/discharge the power of the battery, wherein the capacitor is charged according to ON state of the first switch, transfers the second switch to ON state and, when ON input is not applied to the second switch from the user within a predetermined standby time, the capacitor does not maintain the charged state but is discharged whereby the second switch is transferred to OFF state.

6. The mobile robot according to claim 5, wherein the power control unit applies the power of the battery to the first and second control members to activate the second control member when ON input is applied by the second switch within the standby time, and the capacitor maintains the charged state according to the active state of the second control member received from the first control member so as to retain the second switch in ON state.

7. The mobile robot according to claim 5, wherein the power control unit includes a counter to count frequency thereof when ON input is not applied by the second switch within the standby time and, if the frequency counted by the counter is equal to or more than a preset threshold value, the power control unit determines that the second switch or the capacitor has fault.

8. The mobile robot according to claim 7, wherein, when ON input to the second switch was applied from the user during the frequency counted by the counter, however, the second switch did not maintain ON state but was transferred to OFF state within the standby time, the power control unit determines that the capacitor has fault.

9. The mobile robot according to claim 4, wherein the first switch comprises a form factor-different switch that ON state and OFF state have different appearances, while the second switch comprises a form factor-identical switch that ON state and OFF state have the same appearance.

10. A control method of a mobile robot with battery discharge-preventing performance, the mobile robot comprising: a main body; and a control unit for controlling motion of a driving member that moves the main body by a power stored in a battery, and the control method comprising:

moving the main body to the charging station using the driving member in order to charge the battery when a residual level of the battery reaches a second residual level;

blocking power supply from the battery to the control unit when the residual level of the battery reaches a first residual level;

wherein the second residual level is higher than the first residual level; and wherein a difference between the first residual level and the second residual level is at least equal to a sum of a maximum operational power (W1) required to navigate from the furthest point in a task area to the charging station and a recovery power (W2) required to maintain in an operative state when the mobile robot encounters an unintentional stop and needs to be recovered, the recovery power being calculated based on a recovery time comprising a sum of a response standby time and a rebooting time of one or more components of the mobile robot.

* * * * *